United States Patent
Hileman et al.

(10) Patent No.: US 6,215,666 B1
(45) Date of Patent: Apr. 10, 2001

(54) GIGA-BIT INTERFACE CONVERTOR BRACKET WITH ENHANCED GROUNDING

(75) Inventors: Vince P. Hileman, San Jose; Cornelius B. O'Sullivan, Mountain View, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/168,702

(22) Filed: Oct. 8, 1998

(51) Int. Cl.[7] .................................................. H05K 5/00
(52) U.S. Cl. ..................... 361/752; 301/683; 301/684; 301/685; 301/799; 301/800; 301/801; 301/796
(58) Field of Search ..................... 361/727–730, 361/752, 753, 796, 799–800, 816, 818, 683–685; 174/51.1

(56) References Cited

U.S. PATENT DOCUMENTS

| | | |
|---|---|---|
| 5,083,931 | 1/1992 | Davidge et al. . |
| 5,225,629 | 7/1993 | Garrett . |
| 5,534,662 | 7/1996 | Peacock et al. . |
| 5,654,873 | 8/1997 | Smithson et al. . |
| 5,737,193 | 4/1998 | LaRiviere et al. . |
| 5,767,999 * | 6/1998 | Kayner ................................. 359/163 |

FOREIGN PATENT DOCUMENTS

| | | |
|---|---|---|
| 0 129 883 | 1/1985 | (EP) . |
| 0 707 392 | 4/1996 | (EP) . |
| 0 763 792 | 3/1997 | (EP) . |
| 0 425 193 | 5/1999 | (EP) . |

OTHER PUBLICATIONS

"Gigabit Interface Converter (GBIC)", Revision 5.1, Sun Microsystems Computer Company et al., Ju. 6, 1998.

* cited by examiner

Primary Examiner—Jayprakash N. Gandhi
Assistant Examiner—Tuan Dinh
(74) Attorney, Agent, or Firm—O'Melveny & Myers LLP

(57) ABSTRACT

A giga-bit interface convertor module bracket assembly having upper and lower ground springs. The upper ground spring has upper wing-shaped springs in the upper part of the front opening of the bracket assembly and a pair of upper spring tabs on the interior of the bracket assembly. The lower ground spring has lower wing-shaped springs in the lower part of the front opening of the bracket assembly and a pair of lower spring tabs on the interior of the bracket assembly. When a giga-bit interface convertor module is inserted in the bracket assembly through the front opening, the upper and lower spring tabs bias against the top and bottom walls of the giga-bit interface convertor module to provide grounding thereto. Additionally, the upper and lower wing-shaped springs contact with a front panel of an enclosure or bracket or an electronic card on which the bracket assembly sits. The lower ground spring is provided with a bottom ground spring to contact the electronic card for grounding.

29 Claims, 4 Drawing Sheets

GIGA-BIT INTERFACE CONVERTOR BRACKET WITH ENHANCED GROUNDING

BACKGROUND OF THE INVENTION

1. Field of the Invention

The present invention relates to an improved bracket for a giga- bit interface convertor. More particularly, the bracket provides an improved grounding to a PCI card, daughter card, motherboard and the like.

2. Background

A bracket provided in accordance with the present invention is designed to contain a universal giga-bit interface convertor (GBIC) module. A giga-bit interface convertor is a high-speed data transfer switch that can be used to interconnect work stations, main frames, supercomputers and storage devices. It can be employed at various locations in a computer network where giga-bit data is transferred. A high-speed data transfer switching is used in many applications such as Video on Demand and interactive video, which require faster access to large data storage systems such as DASDs and RAIDs.

FIG. 1 shows an example of a network where giga-bit interface convertors are employed. A mass storage 1 may be DASD/RAID mass storage. The mass storage 1 is connected to a server 3. Data transfer rate is in the order of Gbits/sec. For instance, the rate may be 1.0625 Gbits/sec. with provisions for 2.125 Gbits/sec. and 4 Gbits/sec. The server 3 is in turn connected to a hub or switch 5 by a giga-bit interface convertor module 9. The giga-bit interface convertor module 9 plugs into a guide assembly or bracket (FIG. 2) provided on a motherboard 6. In place of a motherboard, any printed card may be employed. A plurality of work stations 7 are provided to connect with the hub 5 for giga-bit data transfer.

FIG. 2 shows a giga-bit interface convertor module 11, a bracket or guide assembly 15 and an interface expansion card 17. The giga-bit interface convertor module 11 shown here is of a type which employs twenty-position straddle mount plug 19 on one end and a duplex copper interface 21 on the other. It is noted that the interface can be fiber optics rather than copper. The plug end 19 is inserted through an opening 23 in the front of the guide assembly 15 until the plug connects to a receptacle 29. Simultaneously, detents on the giga-bit interface convertor module 11 snap into place on the guide assembly 15. A pair of channels 25 are defined on longitudinally extended sides of the module 11 and a complementary pair of bars 27 are provided on the interior sides of the guide assembly 15 for mating with the channels 25 so that the module 11 may be suitably aligned and guided toward the rear of the guide assembly 15. The plug end 19 of the module 11 is received by the receptacle 29, which in this case is a twenty-position right-angle receptacle, provided on the interface expansion card 17.

As shown in FIGS. 3–5, the guide assembly 15 has an integrally formed housing 16, which is made of thermoplastic. When the guide assembly 15 has no module plugged into it, a self-closing metallic dust door 31 shields the interior of the interface expansion card 17 from the exterior environment. The dust door 31 is spring-biased with an expansion card spring 100 (FIG. 5) provided on one side of the guide assembly 15. Upper and lower grounding clips 33 and 35 are provided at the opening 23 of the guide assembly 15 to make contact with both the module 11 and the interface expansion card 17. The upper and lower grounding clips 33 and 35 are in turn provided with a plurality of tabs 32, 34 (see FIG. 3) which are slightly raised from the rest of the grounding clips 33, 35. Although this is intended to provide a ground path as explained below, only a limited and partial ground path is established.

The guide assembly 15 employs integrally-formed hold-down latches 37 to fit in corresponding hold-down latch apertures 38 formed in the interface expansion card 17. To provide alignment and stability, the guide assembly 15 also employs two pairs of alignment knobs 39 adjacent the hold-down latches, which fit in corresponding knob apertures 41 formed in the interface expansion card 17. Further, two guide assemblies, each of which is identical to the guide assembly 15, may be mounted side-by-side on interface expansion card 17.

The above-described conventional guide assembly 15, however, does not provide grounding to the interface expansion card 17 and only a very limited grounding to the giga-bit interface convertor module 11 and to the interface panel, and requires a significant amount of re-engineering before it can be used in a commercial environment. For instance, an extra gasket must be provided to aid the dust door 31 with its electromagnetic interference attenuation. The guide assembly 15 has problems with electromagnetic interference emanating from the plugged-in module 11 because the guide assembly 15 does not adequately contain electromagnetic interference. Specifically, the giga-bit interface convertor, module 11 needs a high frequency, low impedance path to ground, and the opening, through which the giga-bit interface convertor module 11 is accessible to the user, needs to be shielded when the giga-bit interface convertor module 11 is not installed.

SUMMARY OF THE INVENTION

A guide assembly for a giga-bit interface convertor module is provided having a pair of ground springs: an upper ground spring and a lower ground spring. The upper ground spring is provided with an upper wing-shaped leaf spring portion at the front of the guide assembly, which makes contact with front panel of an electronic card enclosure or bracket which houses the giga-bit interface convertor. The upper ground spring is also provided with a pair of upper grounding tabs which are located on the upper interior wall adjacent the front opening of the guide assembly. In this way, a ground path for the top of the giga-bit interface convertor module is established. In addition, the top of the opening in the front panel of the enclosure is divided into smaller slots, thereby lowering high frequency emissions.

Similarly, the lower ground spring is provided with a lower wing-shaped spring portion at the front of the guide assembly to make contact with the front panel. The lower ground spring is also provided with a pair of lower grounding tabs located on the lower interior wall of the guide assembly adjacent the front opening thereof. In this way, a ground path for the bottom portion of the giga-bit interface convertor module is established, and the bottom of the opening in the front panel is divided into smaller slots, thereby further lowering high frequency emission. The lower ground spring is further provided with a bottom ground spring portion which protrudes from the bottom of the guide assembly. The bottom ground spring portion makes contact with the electronic card to which the bracket is mounted. Additional electromagnetic interference attenuation may be attained by this contact.

DETAILED DESCRIPTION OF THE PREFERRED EMBODIMENT

Figure 6:
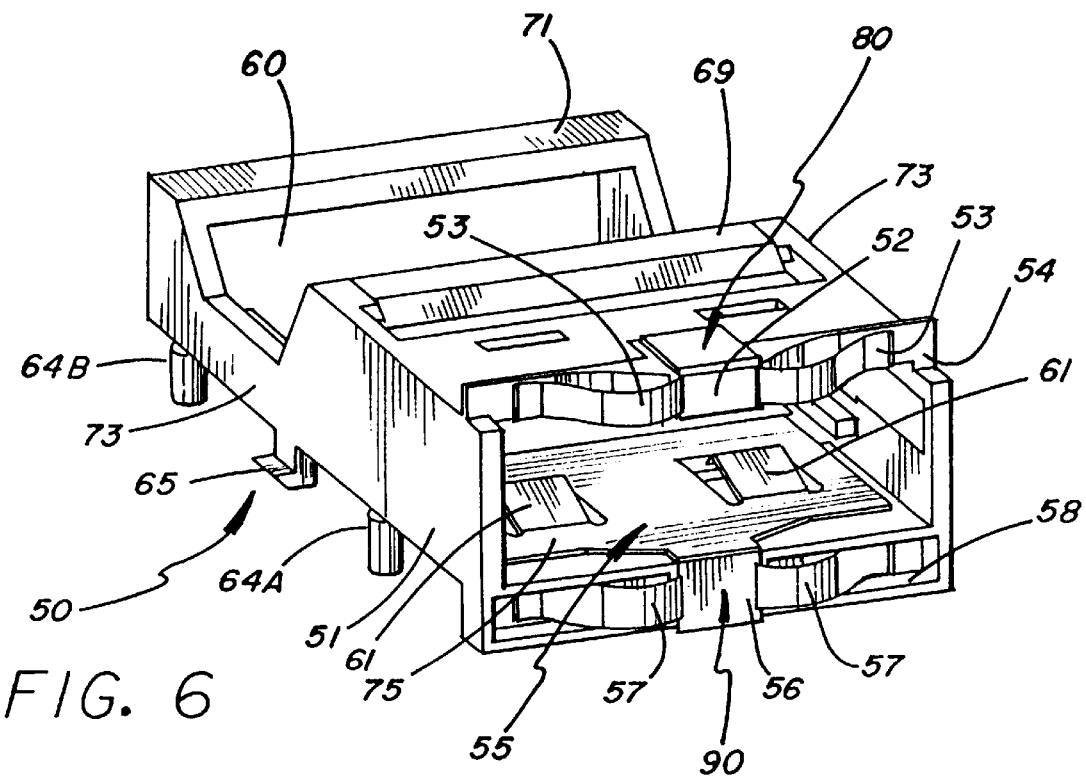
FIG. 6 is a top plan view of a bracket according to the present invention.
Figure 7:
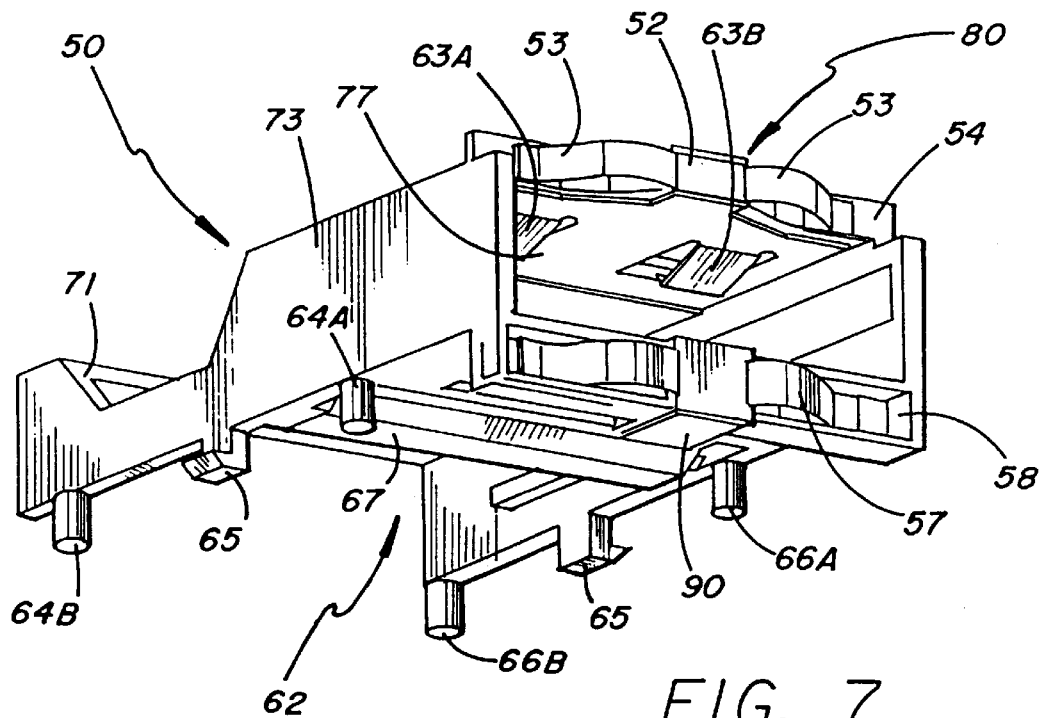
FIG. 7 is a bottom plan view of the bracket of FIG. 6.

FIGS. 6 and 7 show a bracket or guide assembly 50 according to the present invention. The bracket 50 has a bracket housing 51 which is formed from a plastic material. The bracket 50 is provided with a pair of ground springs: an upper ground spring 80 and a lower ground spring 90. Both ground springs 80, 90 may be made from any number of tin-plated sheet metal or beryllium copper materials.

The upper ground spring 80 has two upper wing-shaped spring portions 53 located at the upper rim 54 of the front opening 55 of the bracket housing 51, and a pair of upper grounding spring tab portions 63A and 63B located on the interior front wall portion 77 of the bracket housing 51. A substantially flat central portion 52 is located between the two upper wing-shaped spring portions 53. The upper wing-shaped spring portions 53 make contact with the front panel of electronic card enclosure which houses the bracket 50 and the giga-bit interface convertor module.

The upper grounding spring tab portions 63 come into contact with the giga-bit interface convertor module when the module is inserted in the bracket housing 51. The upper grounding spring tab portions 63 are inclined as shown in FIG. 7 so that when the giga-bit interface convertor module is inserted in the bracket housing 51, the module easily slides in. The upper grounding spring tab portions 63 are biased against the top of the giga-bit interface convertor module, thereby making contact with the top of the module to establish a ground path. In this way, the upper ground spring 80 provides a ground path for the top of the giga-bit interface convertor module to the front panel of the electronic card enclosure. The upper ground spring 80 also divides the top of the opening in the front panel into smaller slots with the effect of lowering high frequency emissions. Another ground spring portion, a top ground spring portion 69, is formed on the upper ground spring 80 on top of the bracket housing 51. The top ground spring portion 69 holds the upper ground spring 80 and prevents it from disengaging from the bracket housing 51.

The lower ground spring 90 is provided with a pair of lower wing-shaped spring portions 57, a pair of lower ground spring tab portions 61 and a bottom ground spring portion 67. The lower wing-shaped spring portions 57 are provided on the lower rim 58 of the front opening 55 in the bracket housing 51. As with the upper grounding spring 80, the lower wing-shaped spring portions 57 come in contact with the front panel of the electronic card enclosure which accommodates the bracket 50 and the giga-bit interface convertor module to establish a ground path. In this manner, the upper and lower ground springs 80, 90 ensure that high frequency effects, such as skin effect, are minimized.

The lower ground spring tab portions 61 are provided on a lower interior wall 75 of the bracket housing 51 near the front opening 55. The lower ground spring tab portions 61 are sloped upward away from the front opening 55 of the bracket housing 51. They are also biased against the giga-bit interface convertor module so that a ground path is established between the lower ground spring tab portions 61 and the bottom wall of the giga-bit interface convertor module when the giga-bit interface convertor module is inserted through the front opening 55 of the bracket housing 51 and comes in contact with the lower ground spring tab portions 61.

In this way, the lower ground spring 90 provides a ground path to the bottom of the giga-bit interface convertor module to the front panel of the electronic card enclosure. It also divides the bottom of the opening in the front panel into smaller slots, thereby lowering high frequency emissions.

The bottom ground spring portion 67 substantially longitudinally extending from one side to the other of the bracket housing 51 is formed on the lower ground spring 90 on the bottom side of the bracket housing 51 as shown in FIG. 7. The bottom ground spring portion 67 extends downward to make contact with a ground plane of the electronic card such as a HBA card, an S-bus, a PCI card, a daughter card or a motherboard and the like, thereby further enhancing electromagnetic interference attenuation between the bracket housing 51 and the electronic card on which the bracket housing 51 is mounted.

As shown in FIGS. 6 and 7, two pairs of alignment knobs 64A, 64B, 66A, 66B are provided on the underside of the bracket housing 51. All of the alignment knobs 64A, 64B, 66A, 66B are designed to be longer than a pair of hold-down latches 65 which are provided on the underside of the bracket housing 51. This aids in the assembly of the bracket housing 51 on the interface expansion card panel. The alignment knobs 64A, 64B provided on the left side of the bracket housing 51 and the other two alignment knobs 66A, 66B provided on the right side of the bracket housing 51 may be located at same distances away from the front end of the bracket housing 51. In the alternative, the alignment knobs 64A, 64B may be located at different distances from the ends of the bracket housing 51 so as to be off set from the corresponding pair of alignment knobs 66A, 66B on the other side, as shown in FIG. 7. The right rear alignment knob 66B is located substantially at the very end of the bracket housing 51, whereas the left rear alignment knob 63B is located a short distance from the back end of the bracket housing 51. Similarly, the right front alignment knob 66A and the left front alignment knob 63A are off-set from each other. As with the alignment knobs 64A, 64B, 66A, 66B, the right and left hold-down latches 65 may be off-set from each other as shown in FIG. 7.

Figure 1:
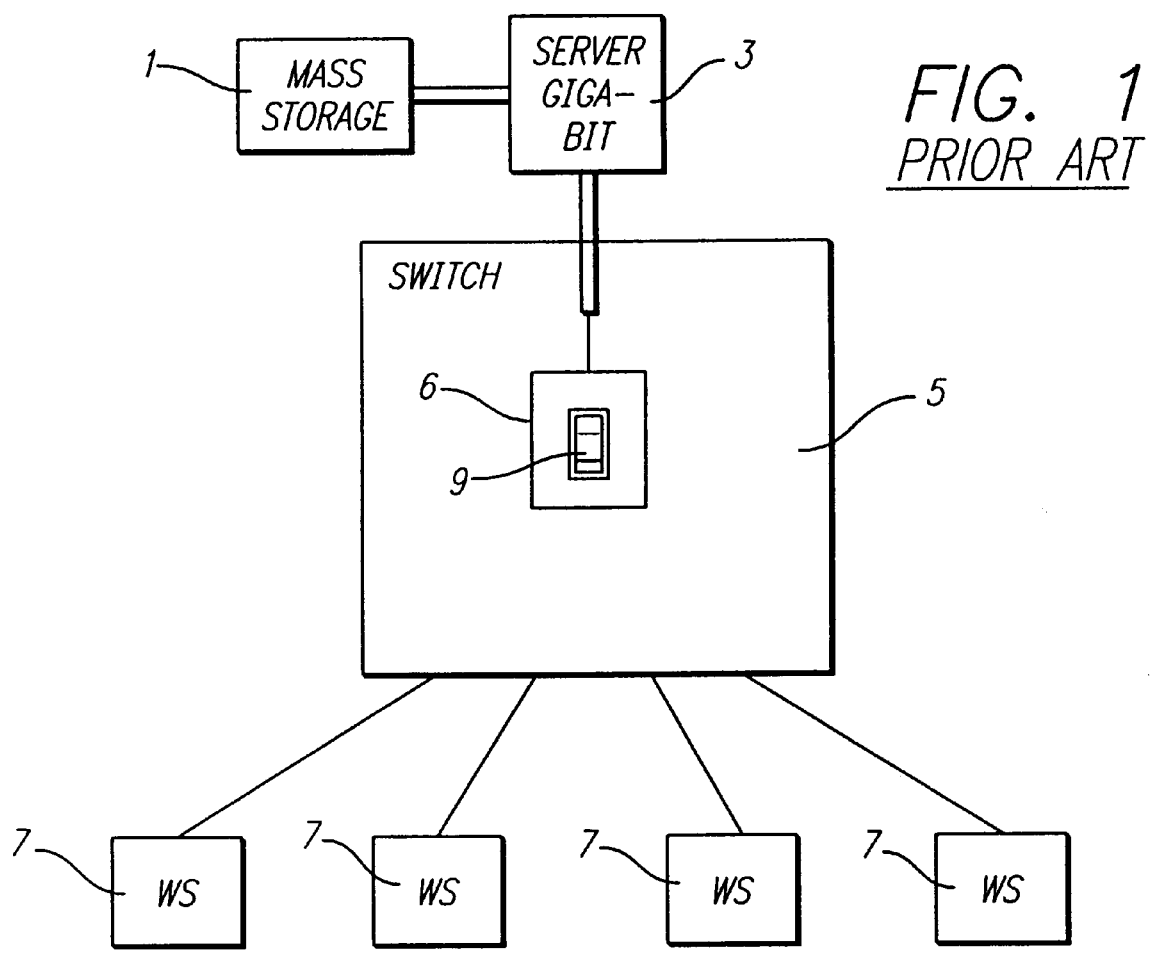
FIG. 1 is a block diagram of a computer network.
Figure 2:
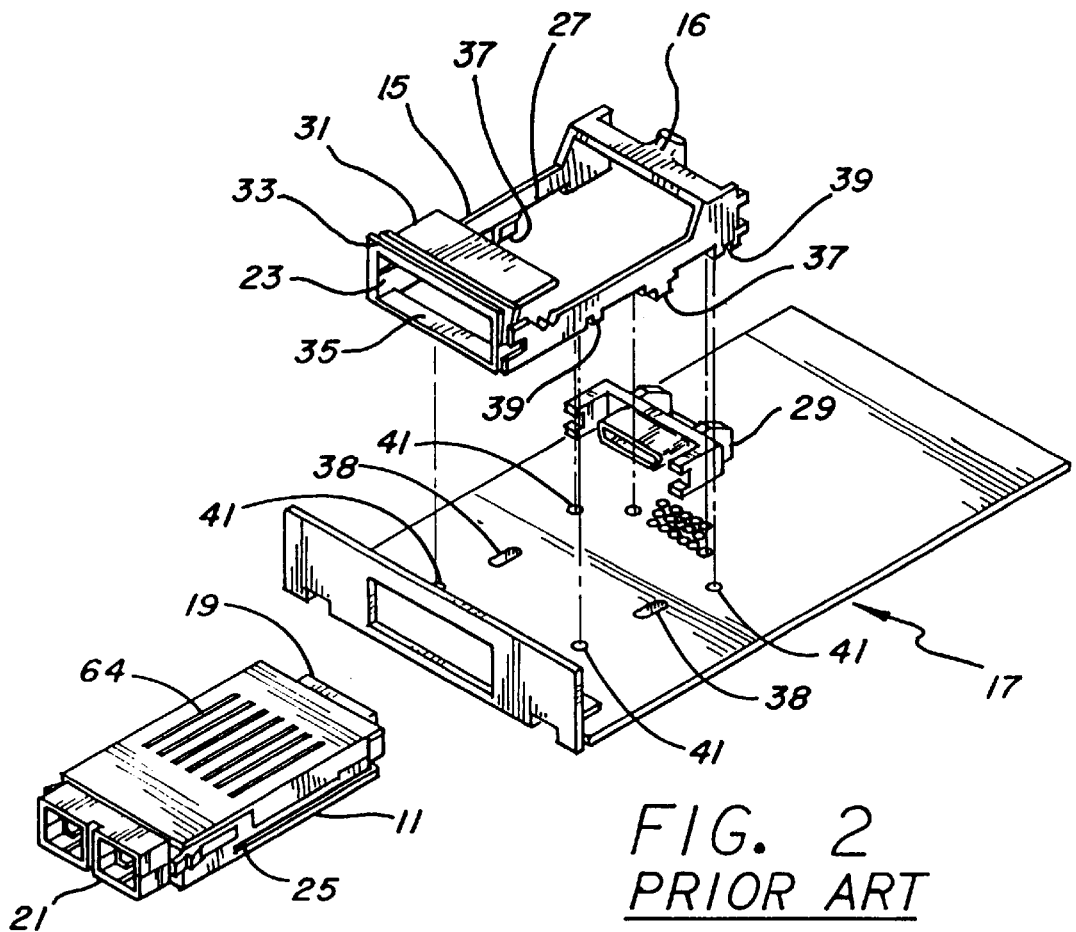
FIG. 2 is an exploded view of a giga-bit interface convertor module, a prior art bracket, and a PCI card.
Figure 3:
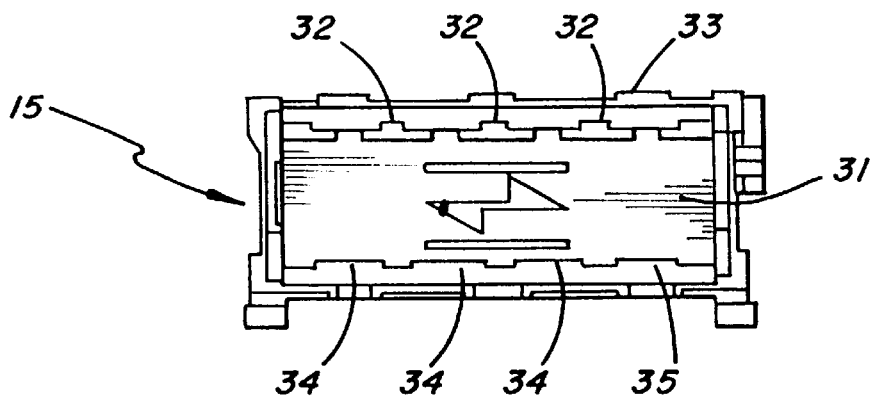
FIG. 3 is a front view of the bracket of FIG. 2.
Figure 4:
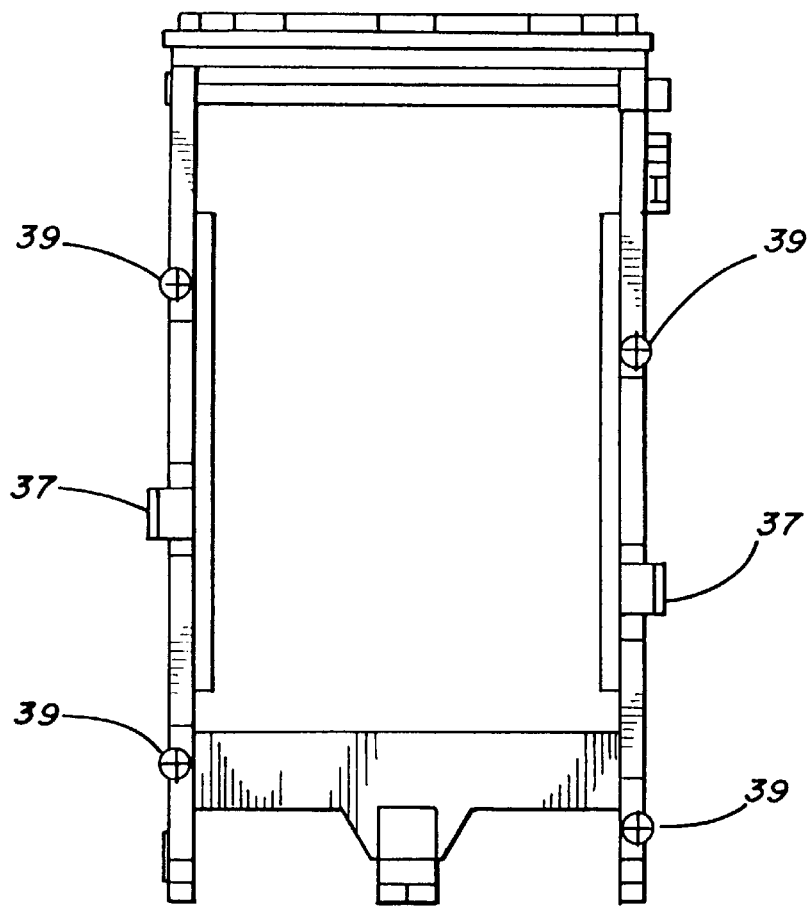
FIG. 4 is a top view of the bracket of FIG. 2.
Figure 5:
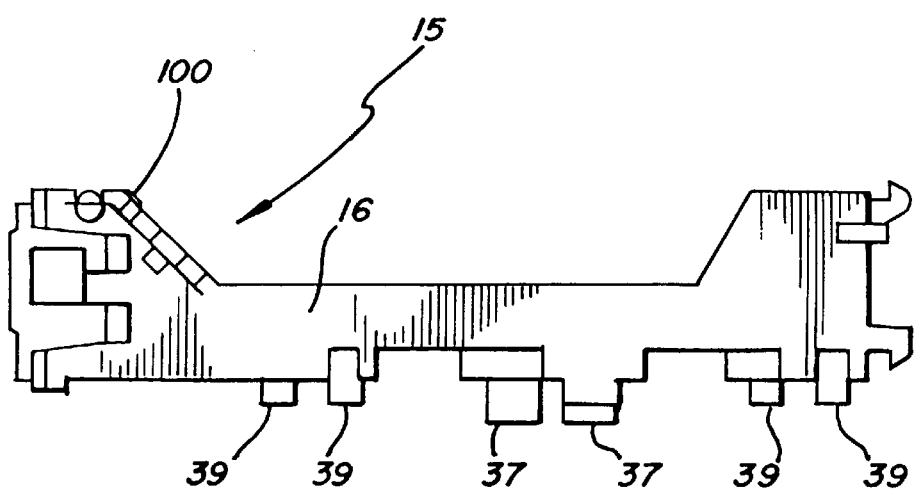
FIG. 5 is a side view of the bracket of FIG. 2.

The bracket housing 51 defines upper and bottom openings 60, 62 so that vents 64 (FIG. 2) on the giga-bit interface convertor module are not blocked. A rear portion 71 of the bracket housing 51 provides stability to the bracket 51. A pair of side walls 73 of the bracket housing 51 extend from the front bracket opening 55 toward the rear end of the bracket housing 51.

The guide assembly 50 is configured so as to be compatible with existing computer components. In particular, mechanical interface to the plastic bracket assembly 50 meets the industry GBIC standard, which is published as "Gigabit Interface Convertor (GBIC)" Revision 5.1, dated and printed Jul. 6, 1998, by Sun Microsystems Computer Company, Vixel Corporation, Compaq Computer Corporation and AMP Incorporated. The height of the bracket 50 above and below the electronic card meets the PCI standards. Retrofitting is possible with the guide assembly 50 according to the present invention with minimal redesign of the interface expansion card.

While specific embodiments of the invention have been described, it will be apparent that obvious variations and modifications of the invention will occur to those of ordinary skill in the art from a consideration of the foregoing description. For example, the present invention can be adopted for use with other types of switch modules. It is therefore desired that the present invention be limited only by the appended claims and equivalents.

What is claimed is:

1. A bracket for accommodating a giga-bit interface converter module disposed on an electronic card in an electronic card enclosure, comprising:

a bracket housing having a top portion, a bottom portion, an upper interior wall and a lower interior wall and a front opening;

an upper ground spring coupled to the top portion of the bracket housing, the upper ground spring including upper wing-shaped spring portions disposed at the front upper rim of the opening, and upper spring tab portions disposed on the upper interior wall; and a lower ground spring coupled to the bottom portion of the bracket housing, the lower ground spring including lower wing-shaped spring portions disposed at the front lower rim of the opening and lower spring tab portions disposed on the lower interior wall, wherein when the giga-bit interface converter module is inserted in the bracket housing through the front opening, the upper spring tab portions and the lower spring tab portions make contact with the giga-bit interface converter module, and wherein the upper and lower wing-shaped spring portions make contact with the electronic card enclosure.

2. A bracket as claimed in claim 1, wherein the electronic card is a PCI card.

3. A bracket as claimed in claim 1, wherein the electronic card is an S-bus.

4. A bracket as claimed in claim 1, wherein the electronic card is a daughter card.

5. A bracket as claimed in claim 1, wherein the electronic card is a motherboard.

6. A bracket as claimed in claims 1, further comprising a bottom ground spring portion formed on the lower ground spring for providing a ground path to the electronic card.

7. A bracket as claimed in claim 1, wherein the electronic card is an HBA card.

8. A bracket for use in a metal enclosure for a computer component in a computer network comprising:

a bracket housing having upper and lower ground springs, said respective ground springs including wing springs biased away from the bracket and disposed at a front upper rim of an opening of said bracket housing; and a plurality of metal tabs provided on the interior walls of the bracket housing, wherein when a computer module having a metal portion on at least a portion of the exterior wall is inserted in the bracket housing, the plurality of metal tabs contact the computer module, and the wing springs come in contact with the metal enclosure of the computer component, and wherein the wing springs and the metal tabs are electrically connected.

9. A bracket as claimed in claim 8, wherein the computer component is a PCI card.

10. A bracket as claimed in claim 8, wherein the computer component is an S-bus.

11. A bracket as claimed in claim 8, wherein the computer component is a motherboard.

12. A bracket as claimed in claim 8, wherein the computer component is an HBA card.

13. A bracket as claimed in claim 8, wherein the computer module is a giga-bit interface convertor module.

14. A bracket as claimed in claim 8, wherein the bracket housing has upper and lower portions and the metal tabs include a pair of upper metal spring tabs and a pair of lower metal spring tabs disposed on the upper and lower portions, respectively.

15. A bracket as claimed in claim 8, wherein the bracket housing has upper and lower portions and the wing springs include upper wing springs and lower wing springs respectively coupled to the upper and lower portions.

16. A switch guide assembly for a first convertor module housed in a computer component, the computer component having a metal panel at a switch outlet for receiving the first convertor module, comprising:

a first switch guide housing having a first front wall, first and second interior walls and a first front opening in the first front wall having first and second rim portions for receiving the first convertor module;

first wing-shaped spring means disposed on the first rim portion of the first front opening;

second wing-shaped spring means disposed on the second rim portion of the first front opening;

first metal ramp means coupled to the first wing-shaped spring means and disposed on the first interior wall of the first switch guide housing; and second metal ramp means coupled to the second wing-shaped spring means and disposed on the second interior wall of the first switch guide housing, wherein the first and second wing-shaped spring means contact the metal panel of the computer component at the switch outlet, and the first and second metal ramp means contact the first convertor module.

17. A switch guide assembly as claimed in claim 16, wherein the computer component is a server.

18. A switch guide assembly as claimed in claim 16, wherein the computer component is a work station.

19. A switch guide assembly as claimed in claim 16, wherein the computer component is a hub.

20. A switch guide assembly as claimed in claim 16, wherein the computer component is a network switch.

21. A switch guide assembly as claimed in claim 16, wherein the computer component is a networked electronic device.

22. A switch guide assembly as claimed in claim 16, wherein the computer component is a DASD mass storage.

23. A switch guide assembly as claimed in claim 16, wherein the computer component is a RAID mass storage.

24. A switch guide assembly as claimed in claim 16, further comprising a bottom ground spring coupled to the second metal ramp means for contacting the computer component.

25. A switch guide assembly as claimed in claim 16, further comprising a second switch guide housing for accommodating a second convertor module having a second guide front wall, third and fourth interior walls and a second front opening in the second front wall having third and fourth rim portions for receiving the second convertor module;

third wing-shaped spring means disposed on the third rim portion of the second front opening;

fourth wing-shaped spring means disposed on the fourth rim portion of the second front opening;

third metal ramp means coupled to the third wing-shaped spring means and disposed on the third interior wall of the second switch guide housing; and fourth metal ramp means coupled to the fourth wing-shaped spring means and disposed on the fourth interior wall of the second switch guide housing, wherein the third and fourth wing-shaped spring means contact the metal panel of the computer component, and the third and fourth metal ramp means contact the second convertor module.

26. A switch guide assembly as claimed in claim 16, wherein the first convertor module is a giga-bit interface convertor module.

27. A switch guide assembly as claimed in claim 25, wherein the second convertor module is a giga-bit interface convertor module.

28. A switch guide assembly as claimed in claim 27, wherein the giga-bit interface convertor module is connected to a plurality of work stations, a server and a mass storage.

29. A guide assembly for accommodating a giga-bit interface convertor module in an enclosure having a metal front panel comprising:

a non-metallic guide housing coupled to a PCI card in the enclosure and including a front guide opening having upper and lower rims for receiving the giga-bit interface convertor module, upper and bottom openings for accommodating vents of the giga-bit interface convertor module, and upper and lower interior portions near the front guide opening, the guide housing having upper wing springs coupled to the upper rim of the front guide opening and lower wing springs coupled to the lower rim of the front guide opening, the guide housing also having a pair of upper metal tabs coupled to the upper interior portion and a pair of lower metal tabs coupled to the lower interior portion, wherein the upper and lower wing springs being biased against the metal panel of the enclosure and the upper and lower metal tabs contact a metal portion of the accommodated giga-bit interface convertor module, thereby providing grounding with respect to the enclosure and the giga-bit interface convertor module, respectively.

* * * * *